US008782334B1

United States Patent
Boyle et al.

(10) Patent No.: US 8,782,334 B1
(45) Date of Patent: Jul. 15, 2014

(54) HYBRID DRIVE COPYING DISK CACHE TO NON-VOLATILE SEMICONDUCTOR MEMORY

(75) Inventors: William B. Boyle, Lake Forest, CA (US); Curtis E. Stevens, Irvine, CA (US); Kenny T. Coker, Firestone, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 105 days.

(21) Appl. No.: 13/207,184

(22) Filed: Aug. 10, 2011

Related U.S. Application Data

(60) Provisional application No. 61/381,921, filed on Sep. 10, 2010.

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |

(52) U.S. Cl.
CPC ............ *G06F 3/0601* (2013.01); *G06F 3/0686* (2013.01); *G06F 3/0605* (2013.01)
USPC ........................................................ 711/111

(58) Field of Classification Search
USPC ...................... 711/111; 369/43, 44.11–44.41; 360/69–78.15
See application file for complete search history.

(56) References Cited

U.S. PATENT DOCUMENTS

| | | | |
|---|---|---|---|
| 5,333,138 A | 7/1994 | Richards et al. | |
| 5,420,998 A | 5/1995 | Horning | |
| 5,457,786 A * | 10/1995 | Roush | 710/100 |
| 5,581,785 A | 12/1996 | Nakamura et al. | |
| 5,586,291 A | 12/1996 | Lasker et al. | |
| 5,636,355 A | 6/1997 | Ramakrishnan et al. | |
| 5,682,273 A | 10/1997 | Hetzler | |
| 5,905,901 A | 5/1999 | Klein | |
| 5,913,067 A | 6/1999 | Klein | |
| 5,954,820 A | 9/1999 | Hetzler | |
| 6,044,439 A | 3/2000 | Ballard et al. | |
| 6,115,200 A | 9/2000 | Allen et al. | |
| 6,236,527 B1 * | 5/2001 | Uchiike et al. | 360/75 |
| 6,275,949 B1 | 8/2001 | Watanabe | |
| 6,295,577 B1 | 9/2001 | Anderson et al. | |
| 6,408,357 B1 | 6/2002 | Hanmann et al. | |
| 6,429,990 B2 | 8/2002 | Serrano et al. | |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Matthew Bradley
*Assistant Examiner* — Craig Goldschmidt

(57) ABSTRACT

A hybrid drive is disclosed comprising a head actuated over a disk comprising a plurality of data sectors. The hybrid drive further comprises a non-volatile semiconductor memory (NVSM) comprising a plurality of memory segments. A disk cache is defined comprising a first plurality of the data sectors, and a non-cache area of the disk is defined comprising a second plurality of the data sectors. When a write command is received from a host, data is written to the disk cache, and under certain conditions, the data is copied from the disk cache to the NVSM.

26 Claims, 7 Drawing Sheets

(56) References Cited

U.S. PATENT DOCUMENTS

| | | |
|---|---|---|
| 6,437,935 B1 * | 8/2002 | Johnson et al. .................. 360/75 |
| 6,614,616 B1 | 9/2003 | Michel et al. |
| 6,661,591 B1 | 12/2003 | Rothberg |
| 6,662,267 B2 | 12/2003 | Stewart |
| 6,687,850 B1 | 2/2004 | Rothberg |
| 6,725,397 B1 | 4/2004 | Emberty et al. |
| 6,732,241 B2 | 5/2004 | Riedel |
| 6,754,021 B2 | 6/2004 | Kisaka et al. |
| 6,798,599 B2 | 9/2004 | Dykes et al. |
| 6,807,630 B2 | 10/2004 | Lay et al. |
| 6,845,456 B1 | 1/2005 | Menezes et al. |
| 6,892,313 B1 | 5/2005 | Codilian et al. |
| 6,909,574 B2 | 6/2005 | Aikawa et al. |
| 6,928,518 B2 | 8/2005 | Talagala |
| 6,968,450 B1 | 11/2005 | Rothberg et al. |
| 7,003,620 B2 | 2/2006 | Avraham et al. |
| 7,017,037 B2 | 3/2006 | Fortin et al. |
| 7,028,174 B1 | 4/2006 | Atai-Azimi et al. |
| 7,076,605 B1 | 7/2006 | Son |
| 7,082,494 B1 | 7/2006 | Thelin et al. |
| 7,107,444 B2 | 9/2006 | Fortin et al. |
| 7,114,029 B1 | 9/2006 | Thelin |
| 7,120,806 B1 | 10/2006 | Codilian et al. |
| 7,139,933 B2 | 11/2006 | Hsu et al. |
| 7,142,385 B2 | 11/2006 | Shimotono et al. |
| 7,206,948 B2 | 4/2007 | Brauer |
| 7,231,198 B2 | 6/2007 | Loughran |
| 7,254,721 B1 | 8/2007 | Tobias et al. |
| 7,275,166 B2 | 9/2007 | Kaiju et al. |
| 7,334,082 B2 | 2/2008 | Grover et al. |
| 7,340,647 B2 | 3/2008 | Aasheim et al. |
| 7,350,105 B2 | 3/2008 | Aasheim et al. |
| 7,392,340 B1 | 6/2008 | Dang et al. |
| 7,395,452 B2 | 7/2008 | Nicholson et al. |
| 7,411,757 B2 | 8/2008 | Chu et al. |
| 7,421,552 B2 | 9/2008 | Long |
| 7,425,810 B2 | 9/2008 | Hobbet et al. |
| 7,461,202 B2 | 12/2008 | Forrer, Jr. et al. |
| 7,472,222 B2 | 12/2008 | Auerbach et al. |
| 7,477,477 B2 | 1/2009 | Maruchi et al. |
| 7,509,471 B2 | 3/2009 | Gorobets |
| 7,516,346 B2 | 4/2009 | Pinheiro et al. |
| 7,552,347 B2 | 6/2009 | Schutte |
| 7,610,438 B2 | 10/2009 | Lee et al. |
| 7,610,445 B1 | 10/2009 | Manus et al. |
| 7,613,876 B2 | 11/2009 | Bruce et al. |
| 7,644,231 B2 | 1/2010 | Recio et al. |
| 7,647,513 B2 | 1/2010 | Tobias et al. |
| 7,685,360 B1 | 3/2010 | Brunnett et al. |
| 7,698,586 B2 | 4/2010 | Kim et al. |
| 7,752,491 B1 | 7/2010 | Liikanen et al. |
| 7,774,556 B2 | 8/2010 | Karamcheti et al. |
| 7,984,259 B1 | 7/2011 | English |
| 8,060,707 B2 | 11/2011 | Fairhurst et al. |
| 8,245,003 B2 | 8/2012 | Suzuki et al. |
| 8,286,018 B2 | 10/2012 | Chang et al. |
| 2002/0083264 A1 | 6/2002 | Coulson |
| 2003/0140198 A1 * | 7/2003 | Ninose et al. .................. 711/122 |
| 2005/0108473 A1 | 5/2005 | Le Moal et al. |
| 2005/0120251 A1 | 6/2005 | Fukumori |
| 2006/0075185 A1 | 4/2006 | Azzarito et al. |
| 2006/0195657 A1 | 8/2006 | Tien et al. |
| 2007/0006021 A1 | 1/2007 | Nicholson et al. |
| 2007/0050540 A1 | 3/2007 | Klein |
| 2007/0162693 A1 | 7/2007 | Nam |
| 2008/0024899 A1 * | 1/2008 | Chu et al. ........................ 360/69 |
| 2008/0040537 A1 | 2/2008 | Kim |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2008/0288714 A1 | 11/2008 | Salomon et al. |
| 2008/0307270 A1 | 12/2008 | Li |
| 2009/0019218 A1 | 1/2009 | Sinclair et al. |
| 2009/0024793 A1 * | 1/2009 | Fontenot et al. ............. 711/115 |
| 2009/0031072 A1 | 1/2009 | Sartore |
| 2009/0089501 A1 * | 4/2009 | Ahn et al. .................... 711/113 |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172249 A1 | 7/2009 | Matthews |
| 2009/0172324 A1 | 7/2009 | Han et al. |
| 2009/0172499 A1 | 7/2009 | Olbrich et al. |
| 2009/0198940 A1 | 8/2009 | Ash et al. |
| 2009/0249168 A1 | 10/2009 | Inoue |
| 2009/0271562 A1 | 10/2009 | Sinclair |
| 2009/0327603 A1 | 12/2009 | McKean et al. |
| 2010/0067138 A1 * | 3/2010 | Ooi et al. ........................ 360/71 |
| 2010/0088459 A1 | 4/2010 | Arya et al. |
| 2010/0122030 A1 | 5/2010 | Peters et al. |
| 2010/0169541 A1 | 7/2010 | Freikorn |
| 2010/0191922 A1 | 7/2010 | Dickey et al. |
| 2010/0195243 A1 * | 8/2010 | Zhu et al. .................. 360/73.03 |
| 2010/0325352 A1 | 12/2010 | Schuette et al. |
| 2011/0010490 A1 | 1/2011 | Kwon et al. |
| 2011/0106804 A1 * | 5/2011 | Keeler et al. .................. 707/737 |
| 2011/0283128 A1 | 11/2011 | Farhan et al. |
| 2012/0317338 A1 | 12/2012 | Yi et al. |
| 2013/0024650 A1 | 1/2013 | Ambat et al. |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

DongKyu Lee; Koh, K.; "PDC-NH: Popular data concentration on NAND flash and hard disk drive," 2009 10th IEEE/ACM International Conference on Grid Computing, pp. 196-200, Oct. 13-15, 2009.

* cited by examiner

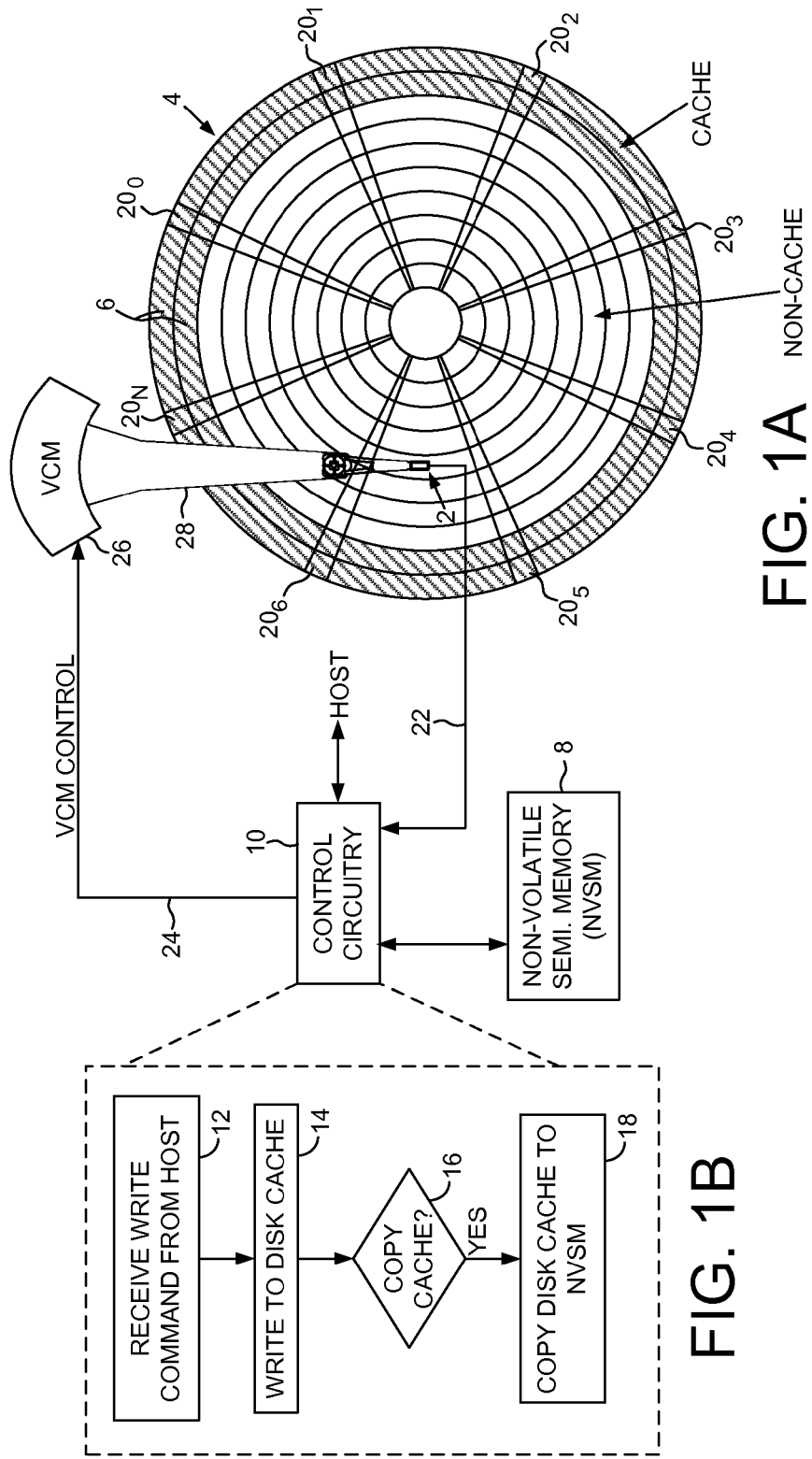

HYBRID DRIVE COPYING DISK CACHE TO NON-VOLATILE SEMICONDUCTOR MEMORY

CROSS-REFERENCE TO RELATED APPLICATIONS

The present application claims priority from provisional U.S. Patent Application Ser. No. 61/381,921, filed on Sep. 10, 2010, the specification of which is incorporated herein by reference.

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

BRIEF DESCRIPTION OF THE DRAWINGS

FIG. 1A is a hybrid drive according to an embodiment of the present invention comprising a head actuated over a disk, and a non-volatile semiconductor memory (NVSM).

FIG. 1B is a flow diagram according to an embodiment of the present invention wherein when a write command is received from a host, data is written to a disk cache, and under certain conditions (e.g., when entering a power save mode) the disk cache is copied to the NVSM.

DETAILED DESCRIPTION OF EMBODIMENTS OF THE INVENTION

Figure 2A:
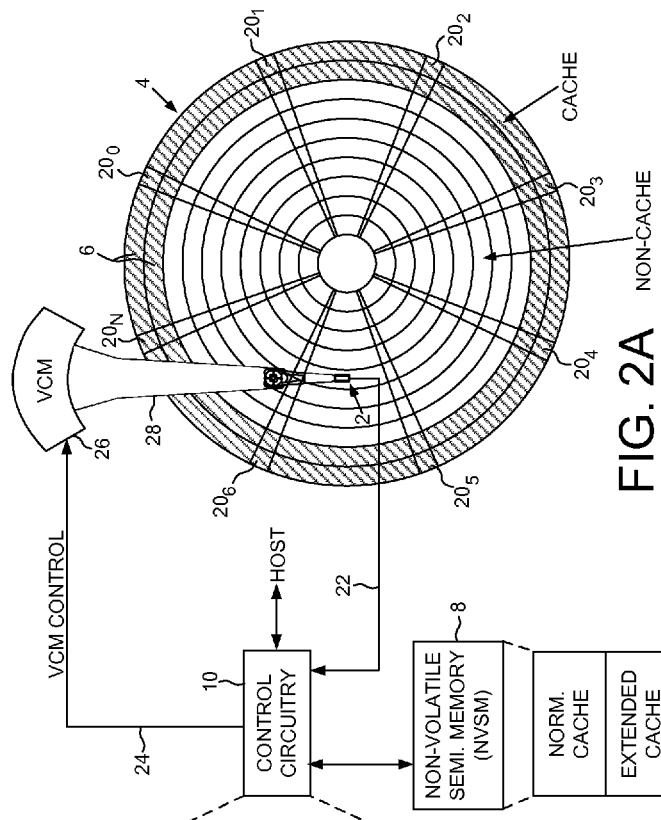
FIG. 2A shows a hybrid drive according to an embodiment of the present invention wherein the NVSM comprises an NVSM cache including a normal cache area and an extended cache area for storing the disk cache.

FIG. 1A shows a hybrid drive comprising a head 2 actuated over a disk 4 comprising a plurality of data tracks 6, wherein each data track comprises a plurality of data sectors. They hybrid drive further comprises a non-volatile semiconductor memory 8 (NVSM) comprising a plurality of memory segments. Control circuitry 10 defines a disk cache comprising a first plurality of the data sectors, and defines a non-cache area of the disk comprising a second plurality of the data sectors. The control circuitry 10 executes the flow diagram of FIG. 1B, wherein when a write command is received from a host (step 12), data is written to the disk cache (step 14), and under certain conditions (step 16), the data is copied from the disk cache to the NVSM (step 18).

In the embodiment of FIG. 1A, any suitable NVSM 8 may be employed, such as any suitable electrically erasable/programmable memory (e.g., a flash memory). In one embodiment, the NVSM 8 comprises a plurality of blocks, where each block comprises a plurality of memory segments referred to as pages and each page may store one or more data sectors. The blocks are programmed a page at a time, and an entire block is erased in a unitary operation. In embodiments described in more detail below, a garbage collection operation may be executed on previously written blocks in order to copy valid pages to new blocks (or to the disk) so that the previously written blocks may be erased and re-used.

The disk 4 shown in the embodiment of FIG. 1A comprises a plurality of servo sectors $20_0$-$20_N$ that define the data tracks 6. The control circuitry 10 processes a read signal 22 emanating from the head 2 to demodulate the servo sectors $20_0$-$20_N$ into a position error signal (PES) representing a position error of the head relative to a target data track. The control circuitry 10 comprises a servo compensator for filtering the PES to generate a control signal 24 applied to a voice coil motor (VCM) 26 that rotates an actuator arm 28 about a pivot in order to actuate the head 2 radially over the disk 4 in a direction that reduces the PES.

In the embodiment of FIG. 1A, the disk cache comprises two data tracks; however, the disk cache may comprise any suitable number of data tracks. In an embodiment shown in FIG. 2A, the NVSM 8 may comprise a NVSM cache, including a normal cache area and an extended cache area. The NVSM cache may improve performance of the hybrid drive by caching the data of disk write commands, wherein the data may be flushed to the disk when the hybrid drive is idle. The disk cache may improve performance by enabling the data of write commands to be simultaneously written to both the NVSM and the disk, as well as to simultaneously read data from both the NVSM and the disk when servicing read commands. In one embodiment, the disk cache may be used to reduce write amplification of the NVSM by spreading write commands over the NVSM cache and the disk cache using any suitable ratio. Storing data of write commands to the disk cache may reduce performance compared to the NVSM cache, but reducing write amplification of the NVSM increases its life, thereby providing some degree of NVSM performance over a longer period.

Figure 2B:
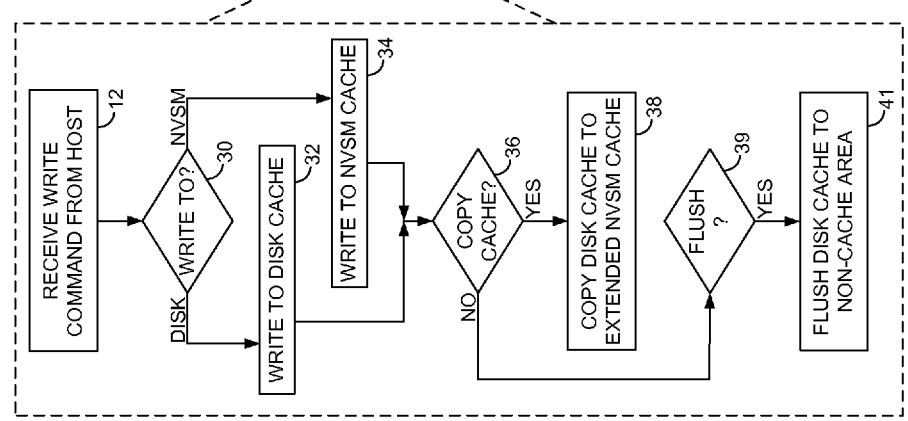
FIG. 2B is a flow diagram according to an embodiment of the present invention wherein when a write command is received from a host, data is written to one of the disk cache and the NVSM cache.

FIG. 2B is a flow diagram according to an embodiment of the present invention wherein when a write command is received from the host (step 12), a determination is made (step 30) as to where to cache the data. The data may be written to the disk cache (step 32) or to the NVSM cache (step 34) based on a usage ratio described above, or based on the bandwidth of each channel. For example, if a previous write command is being serviced by the NVSM cache, a current write command may be serviced by the disk cache so that both channels are simultaneously utilized. In another embodiment, the determination as to where to store data of a write command may be based on a suitable migration policy. For example, data of frequently written logical block addresses (LBAs) may be routed to the disk cache in order to avoid write amplification of the NVSM. While the disk is spun up and data is being written to the disk cache, a decision may be made (step 39) as to whether the data in the disk cache should be flushed to the non-cache area of the disk (step 41). For example, when the disk cache nears capacity the least frequently accessed data stored in the disk cache may be flushed to the non-cache area of the disk to free up space in the disk cache.

Under certain conditions (step 36), the data stored in the disk cache is copied to the extended NVSM cache (step 38). In one embodiment, there is no significant distinction between the normal NVSM cache and the extended NVSM cache (i.e., the extended NVSM cache is just an extension of the normal NVSM cache). In another embodiment, the extended NVSM cache and normal NVSM cache are maintained separately to facilitate garbage collecting the extended NVSM cache when the disk is spun back up.

Figure 3:
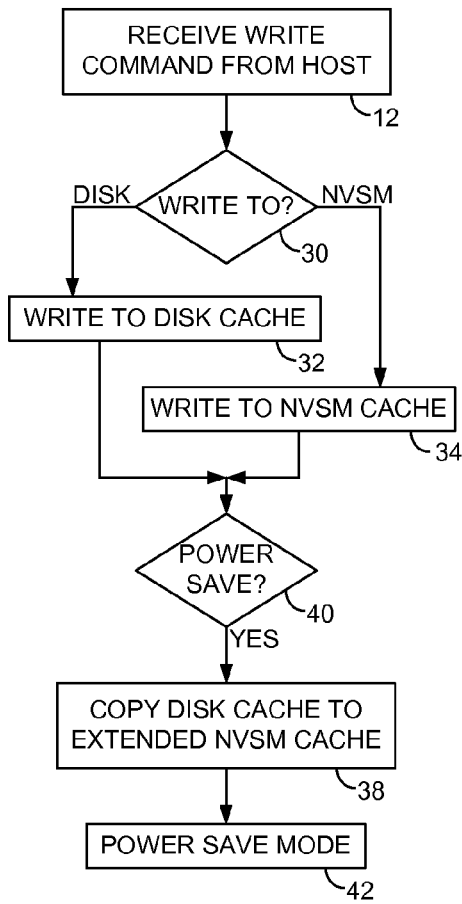
FIG. 3 is a flow diagram according to an embodiment of the present invention wherein the disk cache is copied to the NVSM prior to entering a power save mode.

The control circuitry may decide to copy the disk cache to the NVSM for any suitable reason. FIG. 3 is a flow diagram according to an embodiment of the present invention wherein the hybrid drive may modify its operation to save power, such floating the VCM (disable servoing from the servo sectors), or unloading the head onto a ramp and spinning down the disk. Prior to entering the power save mode (step 40), the data in the disk cache is copied to the extended NVSM cache (step 38). After copying the disk cache to the NVSM, operation of the disk channel can be modified to save power (step 42), such as by unloading the head and spinning down the disk.

Figure 4A:
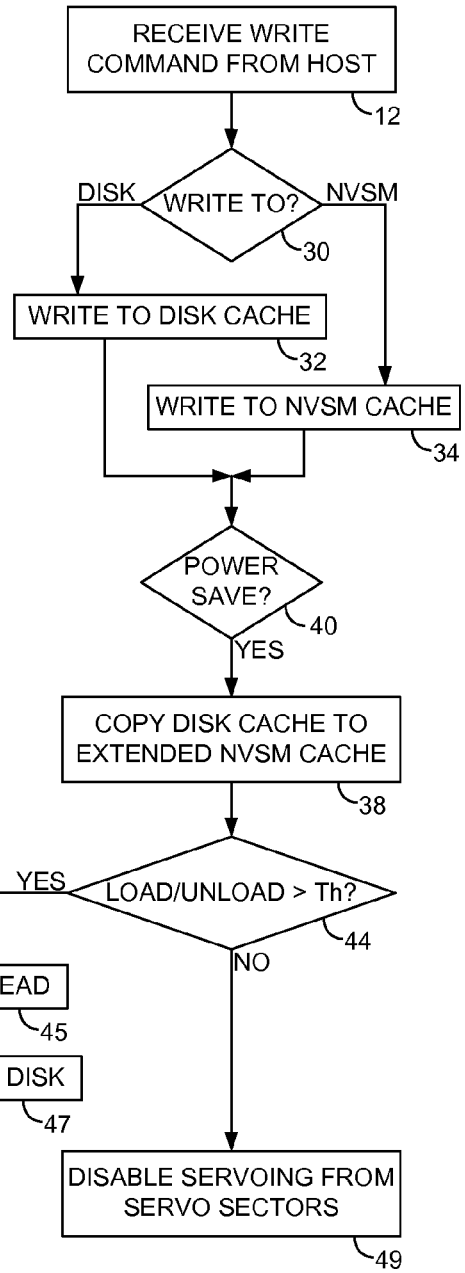
FIG. 4A is a flow diagram according to an embodiment of the present invention wherein prior to entering a power save mode the disk cache is copied to the NVSM and then the head is either unloaded in order to spin down the disk, or servoing from the servo sectors is disabled based on a number of load/unload operations.

FIG. 4A is a flow diagram according to an embodiment of the present invention wherein a number of load/unload operations is evaluated to determine the power save mode to enter. In this embodiment, the head is unloaded onto a ramp and loaded off the ramp over the disk. The friction of the head as it slides along the ramp during unload/load operations can generate unwanted debris that may eventually contaminate the disk surface. In addition, friction between the head and ramp may increase with the number of load/unload operations, thereby making it difficult to reliably control the unload/load velocity of the head. Accordingly, in one embodiment the number of load/unload operations is constrained relative to a threshold that increases over time until reaching a maximum. When entering the power save mode (step 40) and the load/unload operations does not exceed a threshold (step 44), the disk cache is copied to the NVSM (step 38), the head is unloaded onto the ramp (step 45), and the disk is spun down (step 47). When the number of load/unload operations exceeds the threshold (step 44), instead of unloading the head the servoing of the head from the servo sectors is disabled (step 49). For example, the head may be positioned over a middle diameter of the disk, and then a bias current applied to the VCM to maintain the head near the middle diameter of the disk without servoing from the servo sectors.

Figure 4B:
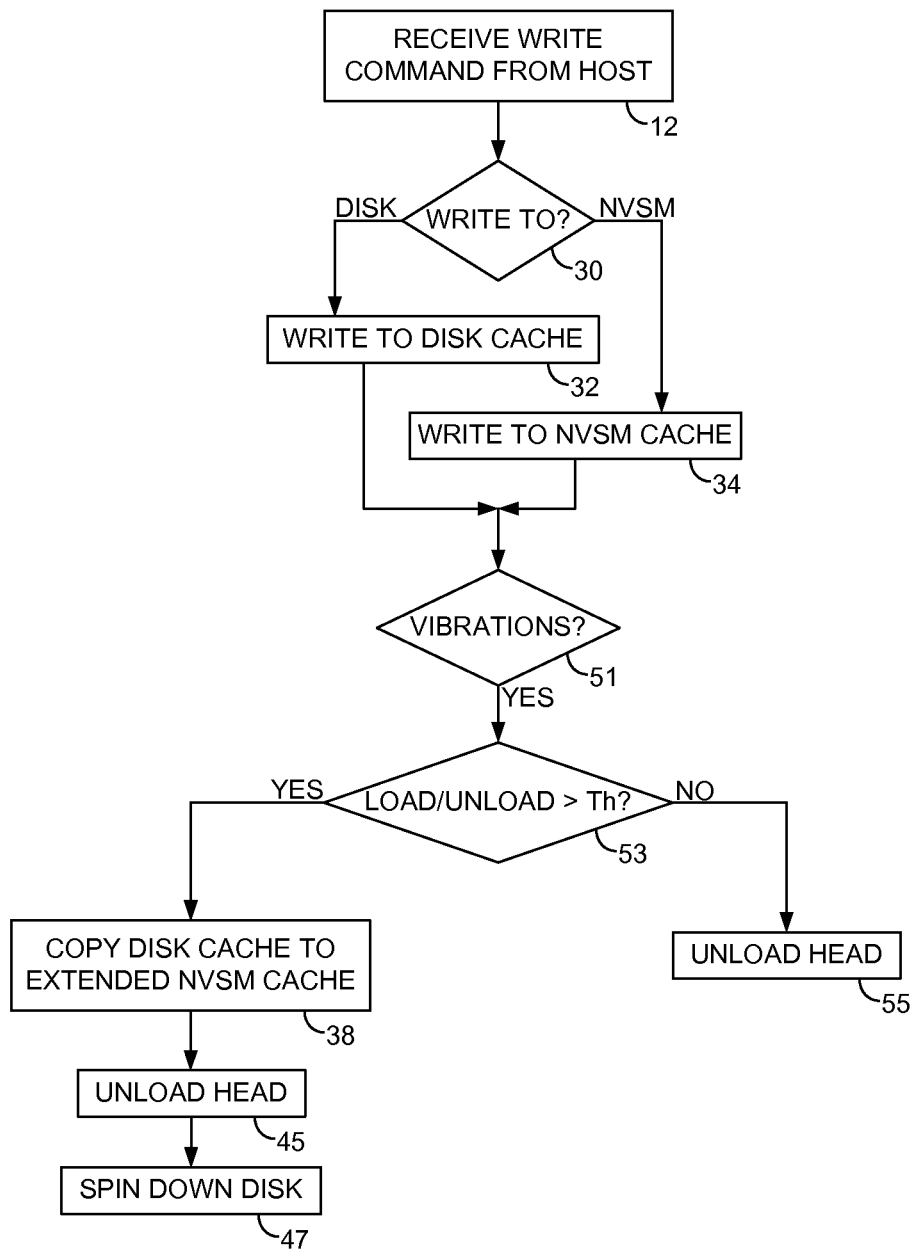
FIG. 4B is a flow diagram according to an embodiment of the present invention wherein when the disk drive is subject to vibrations, and the number of load/unload operations exceeds a threshold, the disk cache is copied to the NVSM, the head is unloaded, and the disk is spun down.

FIG. 4B is a flow diagram according to an embodiment of the present invention wherein the disk cache may be copied to the NVSM (step 38) when the disk drive is subjected to periodic vibrations (step 51) and the number of load/unload operations exceeds a threshold (step 53). In this manner, the head can be unloaded (step 45) and the disk spun down (step 47) so that access commands are serviced by the NVSM rather than continuously unload/load the head each time a vibration is detected. If the number of load/unload operations does not exceed the threshold (step 53), the head is unloaded onto the ramp (step 55) without copying the disk cache to the NVSM and without spinning down the disk. The head may then be loaded onto the disk when the current vibration subsides, or to service the next disk access command.

Figure 5A:
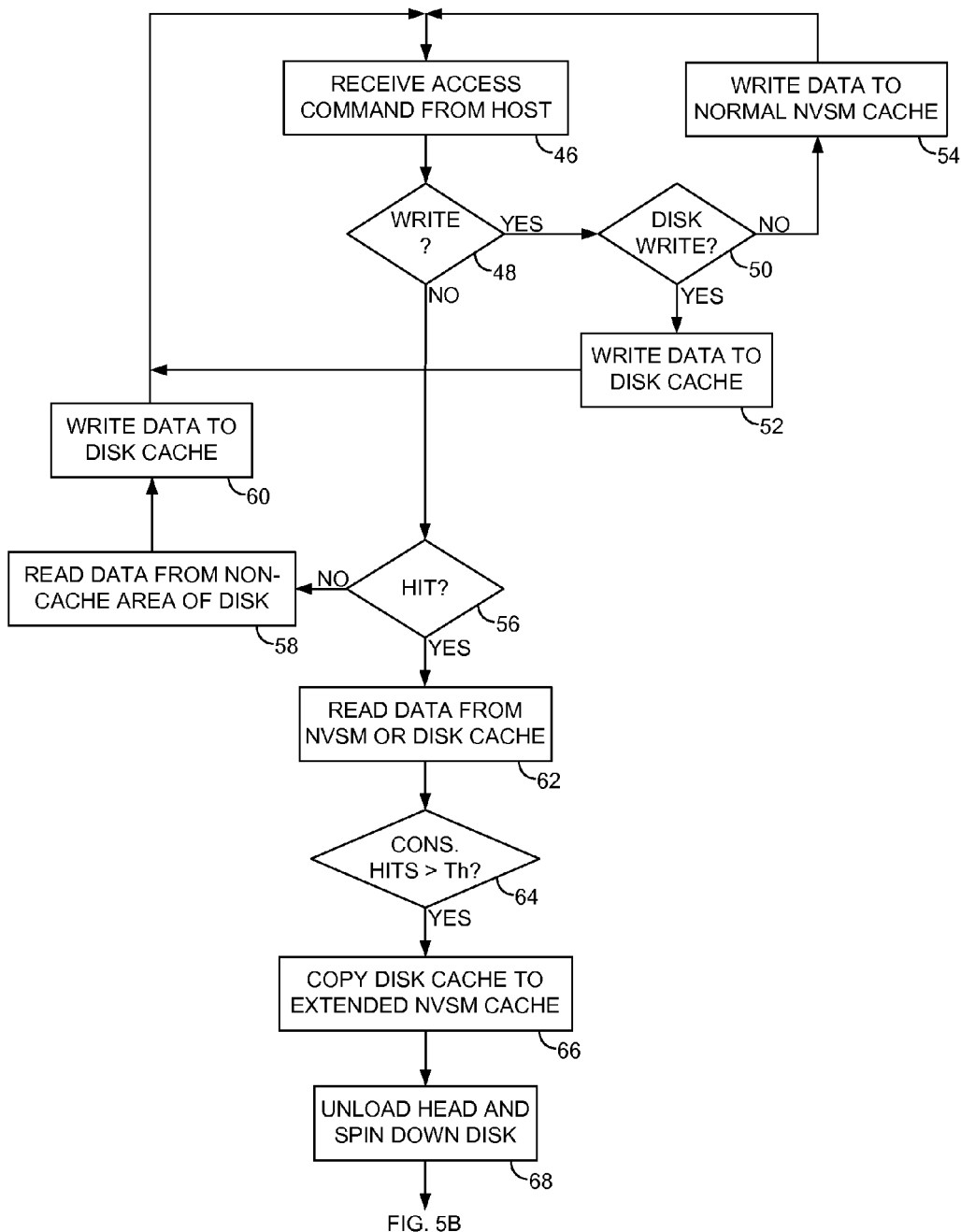
FIG. 5A is a flow diagram according to an embodiment of the present invention wherein when a number of consecutive read commands serviced from either the NVSM or the disk cache exceeds a threshold, the disk cache is copied the NVSM, the head is unloaded, and the disk is spun down.

FIG. 5A is a flow diagram according to an embodiment of the present invention wherein while the disk is spun up an access command is received from the host (step 46). If the access command is a write command (step 48), a determination is made (step 50) as to whether to store the data of the write command to the disk cache (step 52) or to the normal NVSM cache (step 54). If the access command is a read command (step 48), and the data of the read command is not cached in the NVSM or disk cache (step 56), the data is read from the non-cache area of the disk (step 58) and returned to the host as well as stored in the disk cache (step 60). If the data of the read command is cached in the NVSM or disk cache (step 56), the data is read from the cache and returned to the host (step 62). If the number of consecutive read commands serviced by the cache exceeds a threshold (step 64) meaning that the non-cache area of the disk has not been accessed for an extended period, it is assumed that future read commands will be serviced by the cache. Accordingly, the disk cache is copied to the extended NVSM cache (step 66), and the head is unloaded and the disk is spun down (step 68).

Figure 5B:
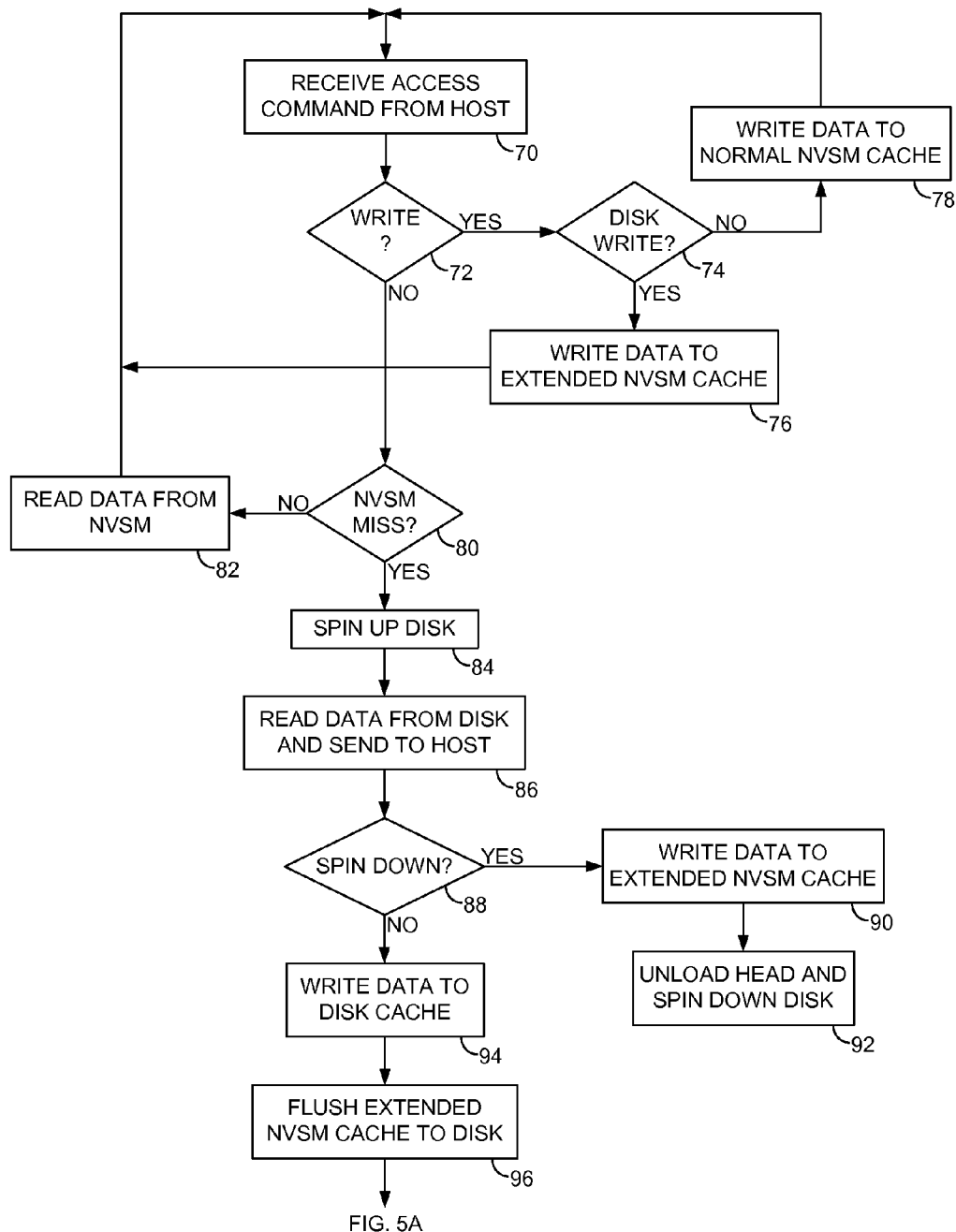
FIG. 5B is a flow diagram according to an embodiment of the present invention wherein the disk is spun up when a read command is received to read data from the non-cache area of the disk.

FIG. 5B is a flow diagram according to an embodiment of the present invention wherein while the disk is spun down an access command is received from the host (step 70). If the access command is a write command (step 72), a determination is made (step 74) as to whether the data of the write command is targeted to the disk cache or to the NVSM cache. If targeted to the disk cache, the data of the write command is written to the extended NVSM cache (step 76), and if targeted to the NVSM cache, the data of the write command is written to the normal NVSM cache (step 78). If the access command is a read command (step 72), and the data of the read command is stored in the NVSM (step 80), the data is read from the NVSM and returned to the host (step 82). If the data of the read command is not stored in the NVSM (step 80), then the disk is spun up (step 84) and the data is read from the non-cache area of the disk and returned to the host (step 86). A determination is made as to whether to spin down the disk (step 88), for example, based on whether additional access commands are being received from the host. If it is determined to spin down the disk, the data of the read command is written to the extended NVSM cache (step 90) and the disk is spun down (step 92). If it is determined to keep the disk spinning, the data of the read command is written to the disk cache (step 94) or alternatively migrated to the flash based on the migration policy. While the disk is spinning and accessible, the data stored in the extended NVSM cache may be flushed to the disk (cache or non-cache area) in order to garbage collect blocks in the extended NVSM cache (step 96).

Figure 6A:
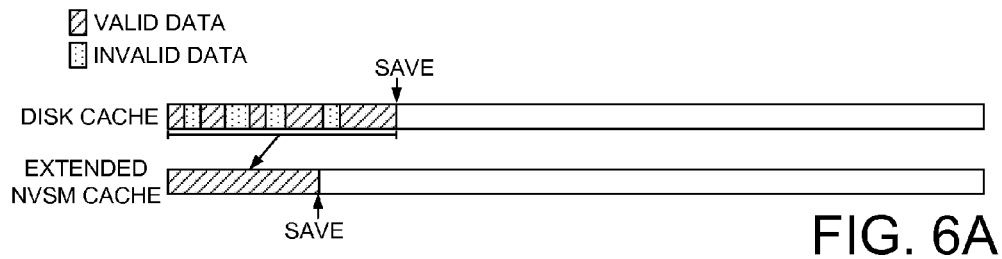
FIG. 6A shows an embodiment of the present invention wherein prior to spinning down the disk, the data stored in the disk cache is copied to the extended NVSM cache.
Figure 6B:
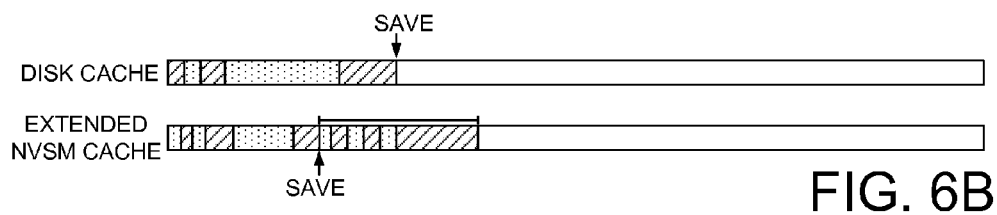
FIG. 6B shows an embodiment of the present invention wherein after spinning down the disk, disk write commands are serviced by the NVSM cache (normal or extended).
Figure 6C:
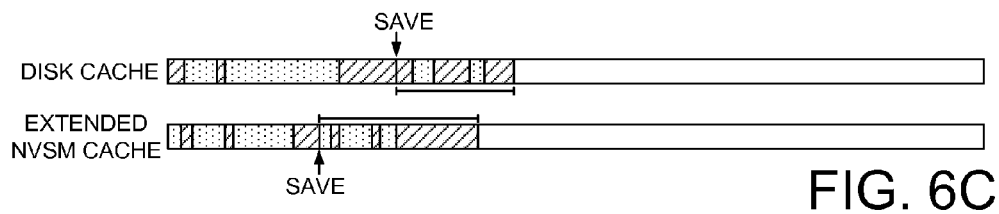
FIG. 6C shows an embodiment of the present invention wherein after spinning up the disk the data written to the disk cache is tracked so that only the newly written data is copied to the NVSM prior to spinning down the disk.

FIG. 6A shows an embodiment of the present invention wherein after writing data to the disk cache, in preparation to spin down the disk the data stored in the disk cache is copied to the extended NVSM cache. In the embodiment of FIG. 6A, only the valid data in the disk cache is copied to the extended NVSM cache. As new write commands are serviced by the extended NVSM cache as shown in FIG. 6B, the data of overwritten LBAs are invalidated in both the extended NVSM cache and the disk cache. FIG. 6C shows an embodiment wherein after spinning up the disk, the current buffer location of is saved. Prior to spinning down the disk again, only the new data written to the disk cache (relative to the saved buffer location) is copied to the extended NVSM cache.

Figure 6D:
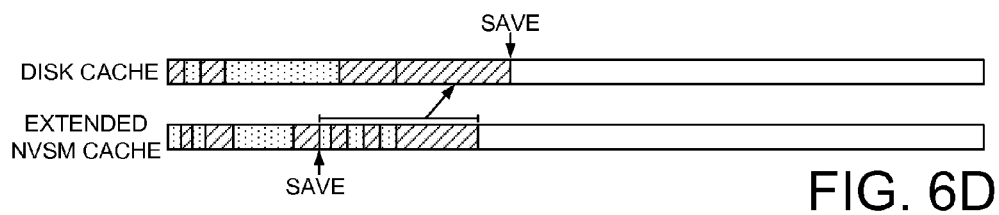
FIG. 6D shows an embodiment of the present invention wherein after spinning up the disk the data of previous write commands serviced by the NVSM is copied to the disk cache.

FIG. 6D shows an embodiment of the present invention wherein when the disk is spun up, the data of write commands serviced by the extended NVSM cache is copied to the disk cache. In this embodiment, storing a copy of the data in both the disk cache and the extended NVSM cache may improve performance by servicing read commands from both channels simultaneously. In addition, waiting until the disk is spun down to copy the data of new write commands to the extended NVSM cache extends the life of the NVSM by reducing write amplification.

Figure 6E:
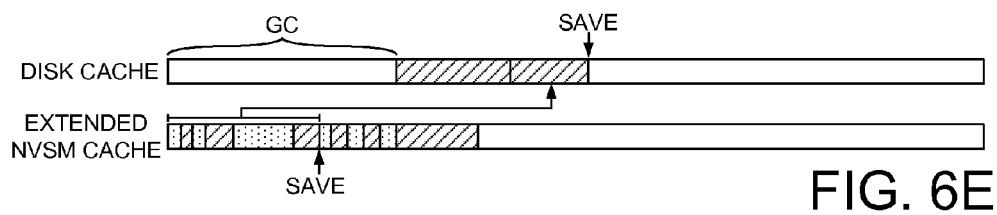
FIG. 6E shows an embodiment of the present invention wherein after spinning up the disk the old data cached in the NVSM is written to the disk cache in order to garbage collect the disk cache.

FIG. 6E shows an embodiment of the present invention wherein the extended NVSM cache is used to garbage collect the buffer of the disk cache. The valid data at the tail of the circular buffer is read from the extended NVSM cache (rather than from the disk cache) and written to the head of the circular buffer. The corresponding segment at the tail of the circular buffer is then marked as invalid (available for overwriting). The data may still be read from either or both the extended NVSM cache and the disk cache since a copy of the data remains in both.

Figure 6F:
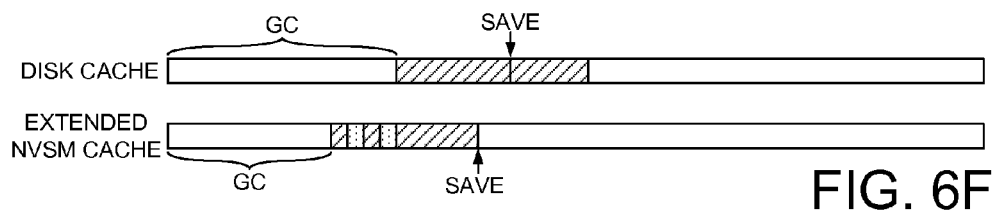
FIG. 6F shows an embodiment of the present invention wherein after copying old data cached in the NVSM to the disk cache, the corresponding blocks of the NVSM are erased (garbage collected).

FIG. 6F shows an embodiment of the present invention wherein the disk cache is used to garbage collect blocks in the extended NVSM cache. After copying valid data from blocks in the extended NVSM cache to the disk cache, the blocks in the extended NVSM cache are erased and made available for re-use. In this embodiment, there is one copy of the data (in the disk cache) until the disk is spun down again (wherein the data is copied back to the extended NVSM cache).

In one embodiment, the data stored in either or both of the disk cache and the NVSM cache may be flushed to the non-cache area of the disk based on any suitable eviction policy (e.g., flushing the least frequently accessed data) in order to free space in either or both caches. If data is flushed from the extended NVSM cache and a copy is stored in the disk cache, the copy in the disk cache is marked as invalid so that it may be overwritten.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk comprising a plurality of data sectors;
   a head actuated over the disk;
   a non-volatile semiconductor memory (NVSM) comprising a plurality of memory segments;
   control circuitry operable to:
   define a disk cache comprising a first plurality of the data sectors;
   define a non-cache area of the disk comprising a second plurality of the data sectors;
   receive a write command from a host, the write command comprising data;
   write the data to the disk cache; and
   copy the data from the disk cache to the NVSM.

2. The hybrid drive as recited in claim 1, wherein the control circuitry is further operable to flush the data in the disk cache to the non-cache area of the disk.

3. The hybrid drive as recited in claim 1, wherein the control circuitry is further operable to copy the data from the disk cache to the NVSM when entering a power save mode.

4. The hybrid drive as recited in claim 1, wherein the control circuitry is further operable to:
   load the head from a ramp to position the head over the disk;
   unload the head from the disk onto the ramp; and
   when a number of load/unload operations exceeds a threshold, copy the data from the disk cache to the NVSM and disable servoing of the head without unloading the head onto the ramp.

5. The hybrid drive as recited in claim 1, wherein the control circuitry is further operable to:
   load the head from a ramp to position the head over the disk;
   unload the head from the disk onto the ramp; and
   when vibrations are detected and a number of load/unload operations exceeds a threshold, copy the data from the disk cache to the NVSM, unload the head onto the ramp, and spin down the disk.

6. The hybrid drive as recited in claim 1, wherein the control circuitry is further operable to:
   maintain a number of consecutive read commands received from the host, wherein each of the consecutive read commands is serviced by reading from one of the NVSM and the disk cache; and
copy the data from the disk cache to the NVSM and spin down the disk when the number of consecutive read commands exceeds a threshold.

7. The hybrid drive as recited in claim 6, wherein while the disk is spun down the control circuitry is further operable to:
receive a read command from the host to read from the non-cache area of the disk;
spin up the disk and read from the non-cache area of the disk; and
determine whether to spin down the disk after reading from the non-cache area of the disk.

8. The hybrid drive as recited in claim 1, wherein the control circuitry is further operable to:
write the disk cache as a circular buffer comprising a buffer head;
spin up the disk and save the buffer head location;
service write commands from the host by writing to the disk cache; and
prior to spinning down the disk, copy part of the disk cache to the NVSM corresponding to a current buffer head location and the saved buffer head location.

9. The hybrid drive as recited in claim 1, wherein the control circuitry is further operable to:
spin up the disk; and
copy valid data from memory segments of the NVSM to the disk cache.

10. The hybrid drive as recited in claim 9, wherein after copying the valid data to the disk cache, the control circuitry is further operable to erase the memory segments of the NVSM comprising the valid data.

11. The hybrid drive as recited in claim 1, wherein the control circuitry is further operable to:
define a NVSM cache comprising a plurality of the memory segments; and
determine, based on a usage ratio between the NVSM cache and the disk cache, whether to write the data to one of the NVSM cache and the disk cache.

12. A hybrid drive comprising:
a disk comprising a plurality of data sectors;
a head actuated over the disk;
a non-volatile semiconductor memory (NVSM) comprising a plurality of memory segments;
control circuitry operable to:
define a disk cache comprising a first plurality of the data sectors;
define a non-cache area of the disk comprising a second plurality of the data sectors;
define a NVSM cache comprising a plurality of the memory segments;
receive a write command from a host, the write command comprising data;
determine whether to write the data to one of the NVSM cache and the disk cache;
write the data to the disk cache; and
copy the data from the disk cache to the NVSM.

13. The hybrid drive as recited in claim 12, wherein the control circuitry is further operable to determine to write the data to the disk cache when the data is assigned to logical block addresses written to more frequently than logical block addresses written to an average number of times.

14. A method of operating a hybrid drive comprising a head actuated over a disk comprising a plurality of data sectors, and a non-volatile semiconductor memory (NVSM) comprising a plurality of memory segments, the method comprising:
defining a disk cache comprising a first plurality of the data sectors;
defining a non-cache area of the disk comprising a second plurality of the data sectors;
receiving a write command from a host, the write command comprising data;
writing the data to the disk cache; and
copying the data from the disk cache to the NVSM.

15. The method as recited in claim 14, further comprising flushing the data in the disk cache to the non-cache area of the disk.

16. The method as recited in claim 14, further comprising copying the data from the disk cache to the NVSM when entering a power save mode.

17. The method as recited in claim 14, further comprising:
loading the head from a ramp to position the head over the disk;
unloading the head from the disk onto the ramp; and
when a number of load/unload operations exceeds a threshold, copying the data from the disk cache to the NVSM and disabling servoing of the head without unloading the head onto the ramp.

18. The method as recited in claim 14, further comprising:
loading the head from a ramp to position the head over the disk;
unloading the head from the disk onto the ramp; and
when vibrations are detected and a number of load/unload operations exceeds a threshold, copying the data from the disk cache to the NVSM, unloading the head onto the ramp, and spinning down the disk.

19. The method as recited in claim 14, further comprising:
maintaining a number of consecutive read commands received from the host, wherein each of the consecutive read commands is serviced by reading from one of the NVSM and the disk cache; and
copying the data from the disk cache to the NVSM and spinning down the disk when the number of consecutive read commands exceeds a threshold.

20. The method as recited in claim 19, wherein while the disk is spun down further comprising:
receiving a read command from the host to read from the non-cache area of the disk;
spinning up the disk and reading from the non-cache area of the disk; and
determining whether to spin down the disk after reading from the non-cache area of the disk.

21. The method as recited in claim 14, further comprising:
writing the disk cache as a circular buffer comprising a buffer head;
spinning up the disk and saving the buffer head location;
servicing write commands from the host by writing to the disk cache; and
prior to spinning down the disk, copying part of the disk cache to the NVSM corresponding to a current buffer head location and the saved buffer head location.

22. The method as recited in claim 14, further comprising:
spinning up the disk; and
copying valid data from memory segments of the NVSM to the disk cache.

23. The method as recited in claim 22, wherein after copying the valid data to the disk cache, further comprising erasing the memory segments of the NVSM comprising the valid data.

24. The method as recited in claim 14, further comprising:
defining a NVSM cache comprising a plurality of the memory segments; and determining, based on a usage ratio between the NVSM cache and the disk cache, whether to write the data to one of the NVSM cache and the disk cache.

25. A method of operating a hybrid drive comprising a head actuated over a disk comprising a plurality of data sectors, and a non-volatile semiconductor memory (NVSM) comprising a plurality of memory segments, the method comprising:
- defining a disk cache comprising a first plurality of the data sectors;
- defining a non-cache area of the disk comprising a second plurality of the data sectors;
- defining a NVSM cache comprising a plurality of the memory segments;
- receiving a write command from a host, the write command comprising data;
- determining whether to write the data to one of the NVSM cache and the disk cache;
- writing the data to the disk cache; and
- copying the data from the disk cache to the NVSM.

26. The method as recited in claim 25, further comprising determining to write the data to the disk cache when the data is assigned to logical block addresses written to more frequently than logical block addresses written to an average number of times.

* * * * *